United States Patent [19]

Björk

[11] 4,031,633
[45] June 28, 1977

[54] SCALE FOR USE IN MEASURING AND STRAIGHTENING DAMAGED VEHICLES IN A SO-CALLED VEHICLE ALIGNMENT APPARATUS

[75] Inventor: Bengt Anders Björk, Eskilstuna, Sweden

[73] Assignee: Aktiebolaget Nike Hydraulik, Eskilstuna, Sweden

[22] Filed: June 28, 1976

[21] Appl. No.: 700,261

[52] U.S. Cl. .................................. 33/288; 33/295; 33/296; 33/298; 33/180 AT; 33/181 AT; 356/172

[51] Int. Cl.² .................. G01B 5/25; G01C 15/08; G01B 11/26

[58] Field of Search ........ 33/138, 180 AT, 181 AT, 33/203.18, 286, 288, 293, 294, 295, 296, 147 D, 147 K, 27 C, 227, 228, 298, 297; 356/172, 250

[56] References Cited

UNITED STATES PATENTS

| | | | |
|---|---|---|---|
| 2,581,021 | 1/1952 | Jacobsen et al. | 33/293 |
| 3,242,576 | 3/1966 | Wheeler | 33/293 |
| 3,271,865 | 9/1966 | Glidden et al. | 33/295 |
| 3,551,057 | 12/1970 | Hamilton et al. | 256/172 |
| 3,611,575 | 10/1971 | Chartier | 33/288 |
| 3,744,133 | 7/1973 | Fukushima et al. | 33/297 |
| 3,983,635 | 10/1976 | Jarman | 33/288 |

FOREIGN PATENTS OR APPLICATIONS

| | | | |
|---|---|---|---|
| 814,128 | 6/1969 | Canada | 33/295 |

*Primary Examiner*—Steven L. Stephan
*Attorney, Agent, or Firm*—Pollock, VandeSande & Priddy

[57] ABSTRACT

The present invention relates to a scale for use in measuring and straightening damaged vehicles in a so-called vehicle alignment apparatus, especially when the measuring is made by using a laser beam, said scale including a fastening means for freely depending fastening of the scale at certain locations on the vehicle, a scale body having a graduated scale, and a line cross that is adjustable to selected position in relation to the fastening means, the graduated scale indicating the distance of the line cross from a predetermined reference point, preferably the joint between the fastening means and the vehicle.

3 Claims, 4 Drawing Figures

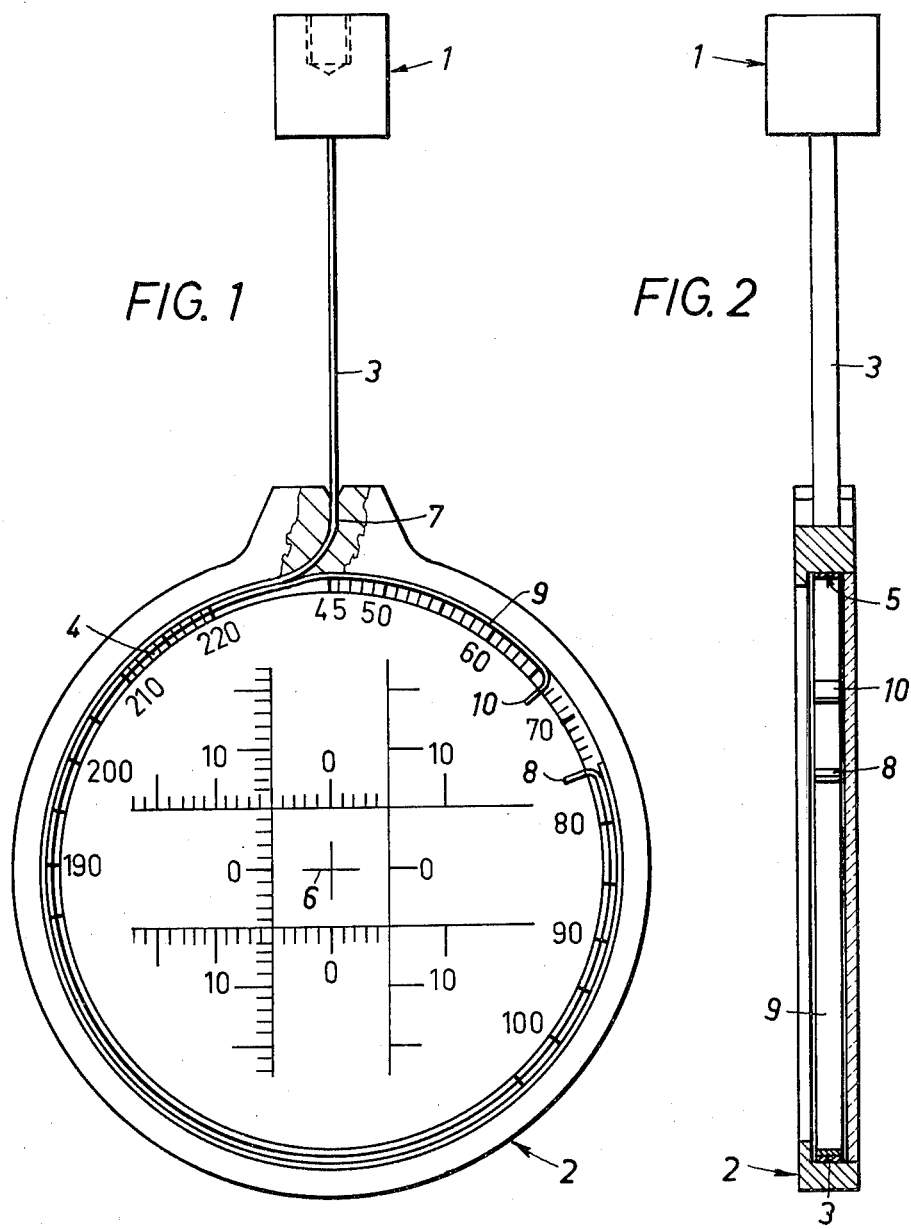

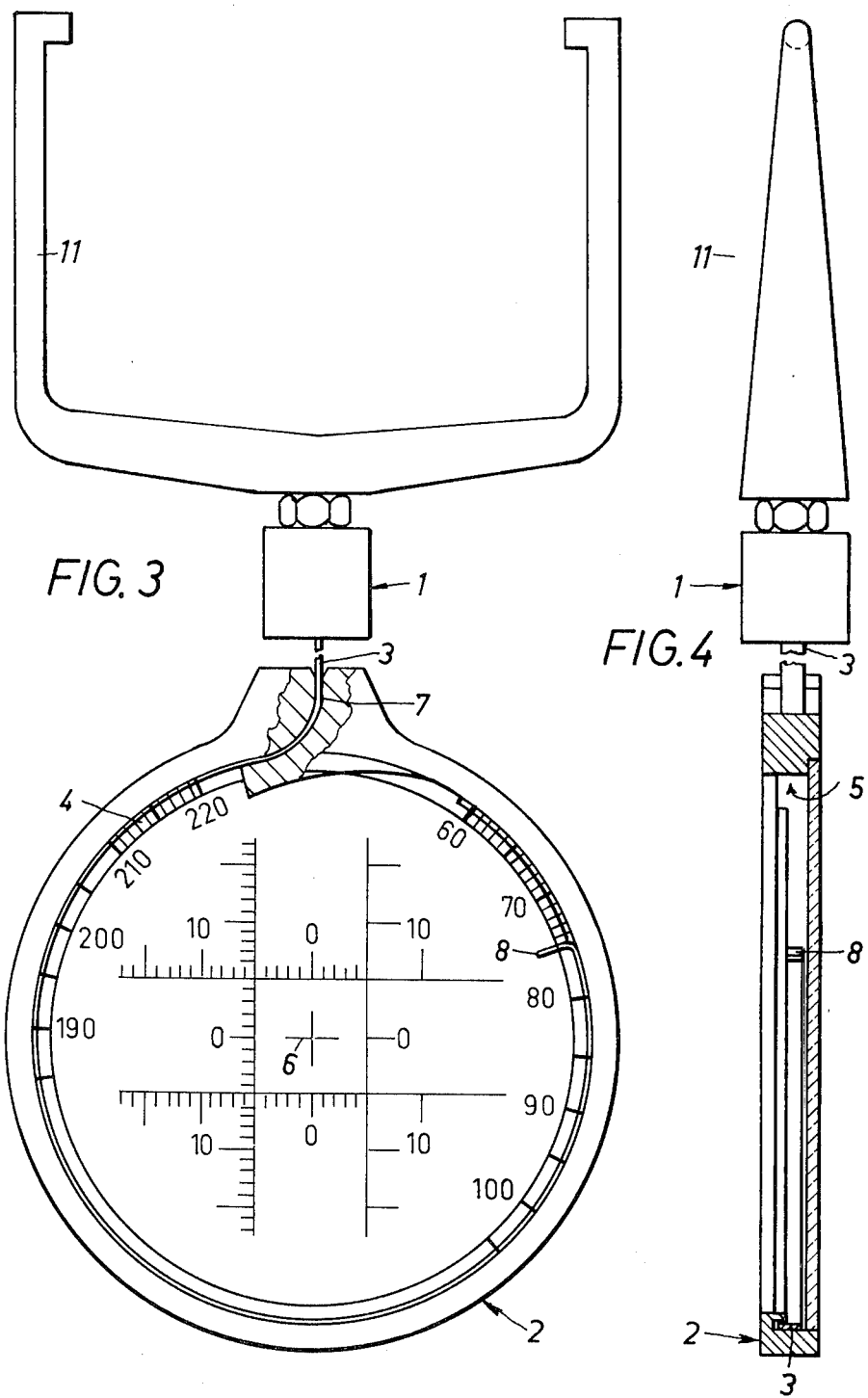

SCALE FOR USE IN MEASURING AND STRAIGHTENING DAMAGED VEHICLES IN A SO-CALLED VEHICLE ALIGNMENT APPARATUS

When a damaged vehicle is to be mounted in a vehicle alignment apparatus it is desirable that the distance between the lowest parts of the vehicle and the alignment apparatus is as small as possible. This is due to the fact that it is desirable to decrease the forces in the chassis mountings and the transverse beams of the vehicle alignment apparatus when the damaged vehicle is aligned. During the measuring it is known to use a scale in the form of a straight, rigid ruler having a linear graduation and a slidable runner on which the line cross is arranged. However, this has some disadvantages, because the scale preferably should be usable for all kinds of measurements. When e.g. a first measurement of a damaged vehicle is made it happens that details as brake drums, brake discs or the like and also exhaust pipes and silencers are still on the vehicle. In that case the scale has to be so long, that the line cross can be positioned lower than these details, because some index points for measurement in the lateral direction of the vehicle sometimes are positioned in line with these details. In this case the rigid ruler must be cut to a suitable length, but this means that the scale is not usable for other measurements.

The object of the present invention is to remove the above cited disadvantages and to provide a scale, the length of which is as small as possible and which if so desired can be easily lengthened. According to the invention this is accomplished with a scale of the initially defined type, said scale being mainly characterized in that the scale body and the graduated scale have circular shape with the line cross arranged in the center of the scale body, and in that an annular groove is cut in the scale body along the scale, said groove being intended for a flexible band which through a slot in the scale body extends substantially radially from the scale body and which at its free end is connected to the fastening means and at its other end is provided with index means which is arranged to indicate, together with the scale, the distance of the line cross from the reference point.

The invention is described in more detail below with reference to the accompanying drawings, on which FIG. 1 is a frontal view of a scale according to one embodiment of the invention, FIG. 2 shows a vertical, central section through the scale of FIG. 1, FIG. 3 is a frontal view of a scale according to another embodiment of the invention, and FIG. 4 shows a vertical, central section through the scale of FIG. 3.

The scale shown in FIGS. 1 and 2 is substantially made up from three main portions, a fastening means 1 intended for fastening the scale at certain locations on a vehicle, a scale body 2, and a thin, flexible band 3 intended to connect the scale body 2 to the fastening means 1 and allow the scale body to be slidable relative to the fastening means in order to lengthen or shorten the scale to the desired length.

The fastening means 1 is preferably made of plastics and is secured to the free end of the flexible band 3, and the fastening means is intended to be combined with an intermediate member which is easily replaceable and is adapted to suit the actual vehicle type.

The scale body 2 is preferably circular and is provided with a circular graduated scale 4 which extends along an annular groove 5 that is cut in the scale body 2. At least the center portion of the scale body is transparent. In the center portion of the scale body 2 a line cross 6 is arranged, said line cross being concentric to the graduated scale 4 and the groove 5. At one point along the periphery the scale body 2 is provided with a substantially radial slot 7, which is curved radially inwards and is connected to the groove 5. The flexible band 3 is inserted through the slot 7 and extends along the groove 5. The end of the band 3 in the groove 5 is provided with an index means 8, in the embodiment according to FIG. 1 and 2 a radially inwardly extending pointer. However, it is also possible to arrange an index means in the form of a mark on the band 3 close to its end, and it is also possible that the squarely cut end of the band is used as index means.

The flexible band 3 of the scale according to FIGS. 1 and 2 is urged radially outwards against the wall of the groove 5 by means of a spring blade 9 arranged radially inwardly of the band 3, one end of the spring blade 9 being secured to the end of the band 3 in the groove 5 and being shaped as index means, in this embodiment a pointer 8. The other end of the spring blade is also provided with an inwardly bent portion 10.

When the scale is to be adjusted to the desired length, i.e. when the line cross 6 is to be adjusted to the desired distance from the fastening means 1, the band 3 is released for movement in the groove 5 in that the inwardly bent portions 8 and 10 of the spring blade are pressed together, so that the action of the spring blade on the band 3 in released. Then the scale body 2 is moved towards or away from the fastening means 1 until the pointer 8 points towards the desired value on the graduated scale 4. Thereafter the spring blade 9 is released, so that the band 3 is locked in the adjusted position. It is then possible to hang the scale freely, and the scale body 2 is always situated at the lower end of the scale, so that the lower end of the scale has a mass concentration, which provides good adjustment to a vertical position.

The scale of FIGS. 3 and 4 differs from the scale according to FIG. 1 and 2 in that no spring blade 9 is provided. The flexible band 3 is in this embodiment held in the scale body 2 only by means of the friction between the band 3 and the walls of the groove 5 in the scale body 2. Otherwise the scale according to FIGS. 3 and 4 corresponds regarding the design and function of the scale according to FIGS. 1 and 2. In FIG. 3 the fastening means 1 is shown together with an intermediate member in the form of a yoke 11 for connection of the scale to a vehicle.

The invention is of course not limited to the above described embodiments, but changes can be made within the scope of the attached claims.

What is claimed is:

1. A scale for use in measuring and straightening damaged vehicles in a so-called vehicle alignment apparatus, especially when the measuring is made by using a laser beam, said scale including a fastening means for freely depending fastening of the scale at certain locations on the vehicle, a scale body having a graduated scale, and a line cross that is adjustable to a selected position in relation to the fastening means, the graduated scale indicating the distance of the line cross from a predetermined reference point, characterized in that the scale body and the graduated scale both have a circular shape with the line cross arranged in the center of the scale body, and in that an annular groove is cut in the scale body along the scale, a flexible band extending substantially radially from the scale body and which at its free end is connected to the fastening means and at its other end is provided with an index means said groove receiving said flexible band so that said flexible band so that said index means registers with said scale, the distance of the line cross from the reference point.

2. A scale according to claim 1, characterized in that a spring is positioned radially inwardly of the band in the scale body to urge the band radially outwards against the wall of the groove.

3. A scale according to claim 2, characterized in that the spring is a spring blade arranged in the groove, one end of the spring blade being rigidly connected to the end of the band and having a shape to form the index means.

* * * * *